(12) United States Patent
Mashimo (10) Patent No.: US 8,081,546 B2
(45) Date of Patent: Dec. 20, 2011

(54) OPTICAL DISK APPARATUS FOR PERFORMING POWER CONTROL

(75) Inventor: Akira Mashimo, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1323 days.

(21) Appl. No.: 11/601,008

(22) Filed: Nov. 17, 2006

(65) Prior Publication Data

US 2007/0115776 A1    May 24, 2007

(30) Foreign Application Priority Data

Nov. 18, 2005    (JP) .................................. 2005-334321
Jan. 6, 2006     (JP) .................................. 2006-001653

(51) Int. Cl.
    *G11B 7/00* (2006.01)
(52) U.S. Cl. .................................................... 369/47.53
(58) Field of Classification Search .................. None
    See application file for complete search history.

(56) References Cited

U.S. PATENT DOCUMENTS

| | | | |
|---|---|---|---|
| 6,771,576 B2* | 8/2004 | Okumura et al. | 369/47.25 |
| 6,958,962 B2* | 10/2005 | Ogawa | 369/47.53 |
| 2003/0169659 A1 | 9/2003 | Miyaki | |
| 2004/0156286 A1* | 8/2004 | Miyaki | 369/47.53 |
| 2004/0246836 A1* | 12/2004 | Choi | 369/47.5 |
| 2005/0094512 A1* | 5/2005 | Sakai et al. | 369/47.5 |
| 2005/0152254 A1* | 7/2005 | Suzuki | 369/53.26 |
| 2005/0213451 A1* | 9/2005 | Nakao et al. | 369/47.53 |
| 2005/0259537 A1* | 11/2005 | Kim | 369/47.5 |

FOREIGN PATENT DOCUMENTS

| | | |
|---|---|---|
| JP | 2003-248929 | 9/2003 |
| JP | 2003-263740 | 9/2003 |
| JP | 2003-281727 A | 10/2003 |

OTHER PUBLICATIONS

Notice of Grounds for Rejection, mailed Oct. 27, 2009, issued in corresponding Japanese Patent Application Serial No. 2006-001653, filed Jan. 6, 2006.
Office Action relating to Japanese Patent Application No. 2006-001653, mailed Feb. 2, 2010, 2 pages.
English language translation of Office Action relating to Japanese Patent Application No. 2006-001653, mailed Feb. 2, 2010, 1 page.

* cited by examiner

*Primary Examiner* — Peter Vincent Agustin
*Assistant Examiner* — Emily Frank
(74) *Attorney, Agent, or Firm* — Seed IP Law Group PLLC (57) ABSTRACT

An optical disk apparatus for performing ROPC. A controller of the optical disk apparatus detects the quantity of reflected light Bo acquired when OPC is performed to set initial recording power Po; computes recording power P such that $Bo/Po^n = B/P^n$ is achieved in relation to the quantity of reflected light B acquired during recording of data; and computes next recording power Pr by use of a coefficient α by means of $Pr = (1-\alpha) \cdot Pc + \alpha \cdot P$ in relation to current recording power Pc, to thus control recording power. The coefficient α is set to $0 < \alpha < 1$, thereby suppressing fluctuations and divergence of recording power. The coefficient α is dynamically set according to a parameter "n."

15 Claims, 5 Drawing Sheets

| DISK | n | α |
|---|---|---|
| D1 | n11 | α11 |
| D1 | n12 | α12 |
| D2 | n21 | α21 |
| D2 | n22 | α22 |

OPTICAL DISK APPARATUS FOR PERFORMING POWER CONTROL

PRIORITY INFORMATION

This application claims priority to Japanese Patent Application No. 2005-334321 filed on Nov. 18, 2005 and Japanese Patent Application No. 2006-001653 filed on Jan. 6, 2006, which are incorporated herein by reference in their entireties.

BACKGROUND OF THE INVENTION

1. Technical Field

The present invention relates to an optical disk apparatus, and more particularly to optimization of recording power during data recording operation.

2. Related Art

Figure 7:
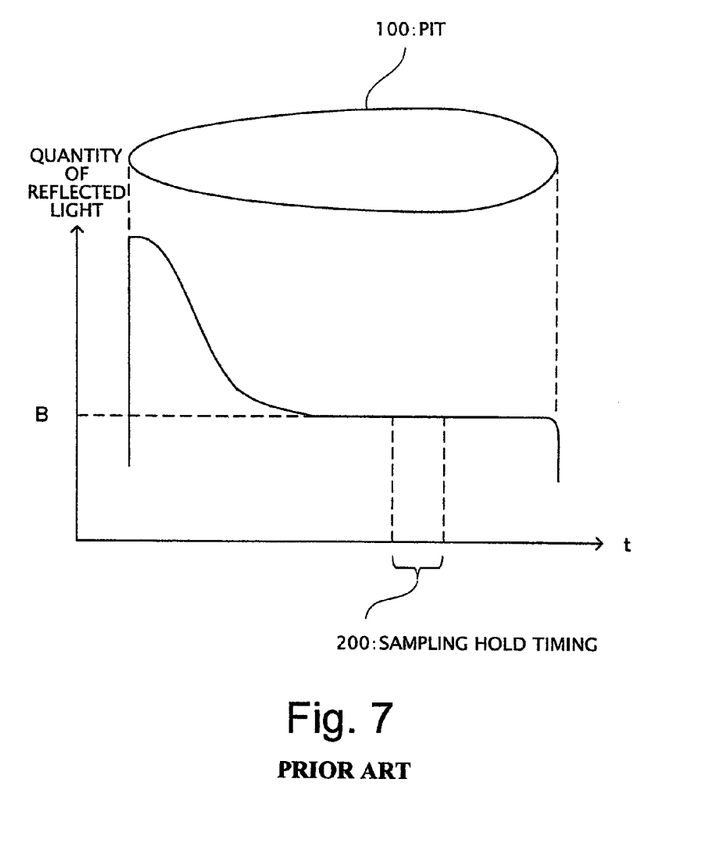
FIG. 7 is a descriptive view showing a relationship between a pit and the quantity of reflected light.

An optical disk apparatus capable of recording data, such as a CD drive, a DVD drive, or the like, has hitherto optimized recording power by means of OPC (Optimum Power Control) and ROPC (Running Optimum Power Control), to thereby record data. OPC is processing for writing test data, for trial purposes, in a predetermined area on an optical disk at various recording power levels; and computing recording power at which the quality of a reproduced signal, such as a β value, the degree of modulation, and the like, acquired by reproduction of the test data, attains a target value. ROPC is processing for controlling recording power in an increasing or decreasing manner according to the quantity of reflected light acquired during recording of data (i.e., the quantity of reflected light acquired when the quantity of reflected light becomes stable after formation of pits, and is hereinafter called a "level B") in light of a change in recording sensitivity attributable to a change in the geometry of a laser beam induced by unevenness in a coating of a recording film in the optical disk, the inclination of the optical disk, or the like. FIG. 7 shows changes in the quantity of reflected light acquired when a pit 100 is formed by irradiating a laser beam of recording power onto an optical disk. The quantity of reflected light is large at an early stage of formation of the pit 100. However, in time the thus-created pit causes diffraction to thus decrease the quantity of reflected light, and the quantity of reflected light becomes stable at a given value (a level B). The level B is detected by means of sample-holding a reflected light signal at this timing. The quantity of reflected light B is defined as the quantity of light reflected at a timing when the quantity of light reflected by the created pit has become stable at a given value.

In general, during ROPC, the quantity of reflected light Bo acquired at recording power Po determined through OPC (the quantity of reflected light acquired at timing when the quantity of light reflected by a pit has become stable at a constant value when the pit has been created at recording power Po) is stored, and recording power is determined such that a value β becomes constant. Consequently, recording power P is determined such that a relationship of $Bo/Po^n = B/P^n$ ... (1) stands at initial recording power Po determined through OPC and the quantity of initial reflected light Bo. As described in Japanese Patent Laid-Open Publication No. 2003-263740, "n" is usually set to two or thereabouts. However, as described in Japanese Patent Laid-Open Publication No. 2003-248929, there may be a case where "n" is set in a range from 1.5 to 10; particularly, in the neighborhood of 3.2.

When the value of a parameter "n" is increased, ROPC becomes less effective. Accordingly, decreasing the value of "n" is conceivable. However, when the value of "n" is decreased, there may also arise a case where recording power fluctuates greatly to thus become divergent.

Figure 8:
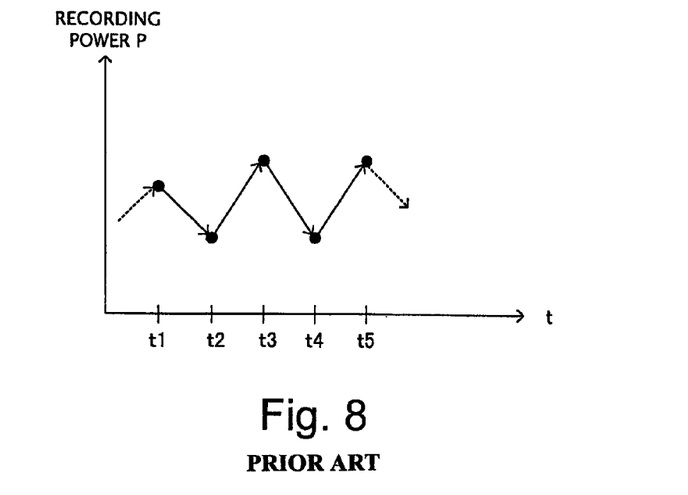
FIG. 8 is a descriptive view of hourly changes in recording power induced by ROPC.

FIG. 8 shows hourly variations in recording power induced by ROPC when "n" is set to a small value ("n"≦2). During execution of ROPC, recording power P is determined on the basis of the quantity of current reflected light B in accordance with Equation (1). Accordingly, recording power fluctuates greatly depending on the quantity of reflected light B. When the quantity of current reflected light B is large, power which is greater than the current recording power is qualitatively required as recording power P. When pits are created at great recording power pursuant to this requirement, the degree of formation of pits becomes excessive, and the quantity of reflected light B is greatly decreased. For this reason, in accordance with a decrease in the quantity of reflected light B, power which is smaller than the current recording power is required as recording power P. When pits are created at small recording power pursuant to the requirement, the degree of formation of pits becomes insufficient. As a result of repetition of the above processing operations, the recording power P fluctuates as shown in FIG. 8, to thus fail to converge. Variations eventually arise in the degree of formation of pits, which contributes to a decrease in recording quality.

SUMMARY OF THE INVENTION

The present invention provides an apparatus capable of ensuring the recording quality of data by means of reliably subjecting an arbitrary optical disk to ROPC to thus optimize recording power.

The present invention provides an optical disk apparatus comprising means for recording test data in a predetermined area of an optical disk and setting initial recording power on the basis of quality of a reproduced signal of the test data; operation means for computing the recording power P from the quantity of reflected light Bo and recording power Po, both of which are employed during initial setting, and from the current quantity of reflected light B and a parameter "n" and by means of a control equation $Bo/Po^n = B/P^n$, and computing the next recording power Pr from the recording power P and current recording power Pc; and control means for controlling recording power so as to attain the computed recording power Pr.

In one embodiment of the present invention, the operation means computes the next recording power Pr from the current recording power Pc and a coefficient α (0<α<1) by means of $Pr = (1-\alpha) \cdot Pc + \alpha \cdot P$.

According to the present invention, the recording power P computed according to the predetermined control equation is not used in an unmodified manner, and the next recording power Pr is determined in consideration of the current recording power Pc. Accordingly, fluctuations and divergence of recording power are suppressed, to thus ensure recording quality.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will be described hereinbelow by reference to the drawings.

Figure 1:
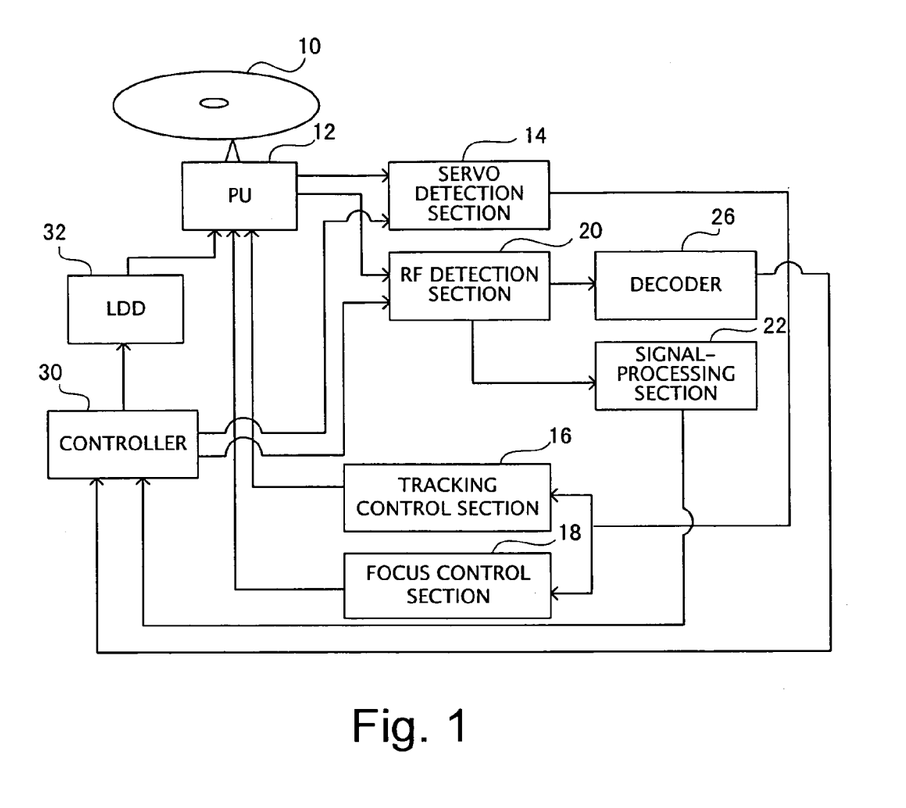
FIG. 1 is a block diagram of the entirety of an optical disk apparatus.

FIG. 1 shows a block diagram of the entirety of an optical disk apparatus according to a present embodiment. A data recordable optical disk 10, such as a CD-R/RW, a DVD-R/RW, or the like, is rotationally driven by an unillustrated spindle motor.

A pickup (PU) 12 is disposed opposite the optical disk 10, and includes a laser diode (LD) for irradiating the surface of the optical disk 10 with a laser beam. The laser diode is driven by a laser diode drive circuit (LDD) 32. At the time of reproduction of data, the laser diode emits a laser beam of reproducing power. At the time of recording of data, the laser diode emits a laser beam of recording power (recording power>reproducing power). The pickup 12 has a quadrant photodetector for converting the laser beam reflected from the optical disk 10 into an electrical signal, and outputs a reproduced signal toa servo detection section 14 and an RF detection section 20.

In accordance with a signal from the pickup 12, the servo detection section 14 generates a tracking error signal and a focus error signal; and outputs the tracking error signal to a tracking control section 16 and the focus error signal to a focus control section 18. In accordance with the tracking error signal, the tracking control section 16 drives the pickup 12 in the widthwise direction of the track of the optical disk 10, to thus bring the pickup 12 into an on-track state. In accordance with the focus error signal, the focus control section 18 drives the pickup 12 in the focus direction, to thus bring the pickup 12 into an on-focus state. In the case of, e.g., a quadrant photodetector, a tracking error signal is generated from a difference among radially-split detectors. A focus error signal is generated from a difference between diagonal sums of the quadrant photodetector. As a matter of course, another method is also possible.

The RF detection section 20 amplifies a signal from the pickup 12 to thus generate a reproduced RF signal and outputs the thus-generated RF signal to a signal-processing section 22 and a decoder 26. During performance of OPC, the signal processing section 22 detects a signal required to compute a β value from a reproduced signal of the test data, and outputs the thus-detected signal to a controller 30. The β value is defined as β value=(|A1|−|A2|)/(|A1|+|A2|). Reference symbol A1 designates a peak value of an AC-coupled RF signal, and A2 designates a bottom value of the same. The signal-processing section 22 detects a peak value and a bottom value at each level of recording power achieved during OPC, and outputs the thus-detected peak and bottom values to the controller 30.

When ROPC is performed, the signal-processing section 22 samples, at predetermined timing, a reflection signal from the optical disk 10 exposed to a laser beam of recording power, to thus detect a level B (the quantity of reflected light B); and outputs the thus-detected level B to the controller 30. Detection of the level B is performed by means of removing an offset of the circuit system. Specifically, the level B achieved when the laser beam is not irradiated is taken as an offset value. During actual recording operation, the value of a level B from which the offset value has been subtracted is output to the controller 30.

The decoder 26 has an equalizer and a binarizer, and boosts a predetermined frequency of a reproduced RF signal; specifically, the amplitude of a 3T signal, and binarizes the thus-boosted amplitude, to thus demodulate a binarized signal. The thus-demodulated binarized signal is output to the controller 30. Demodulation is performed by means of causing an unillustrated PLL circuit to generate a synch clock signal and extract a signal.

The controller 30 controls operations of individual sections, such as the servo detection section 14, the RF detection section 20, the LDD 32, and the like; and outputs demodulated data sent from the decoder 26 to a higher-level device such as a personal computer or the like. In accordance with the recording data output from the higher-level device, the controller 30 drives the LDD 32 during data recording operation, thereby recording data by means of a set recording strategy. In the case of, e.g., a DVD-R, the recording strategy is defined by the pulse width and pulse amplitude of a top pulse and the pulse width and pulse amplitude of a subsequent pulse, which are acquired when 3T data among sets of 3T to 14T (T denotes the reference period of a length in the track direction) data are recorded with a single pulse and sets of data 4T or more are recorded with multiple pulses. Prior to recording data, the controller 30 performs OPC. Namely, the controller 30 drives the LDD 32 to record frames of test data in the test area of the optical disk 10 at various recording power levels; and reproduces the test data to thus compute a value β at each of the recording power levels from the peak value and the bottom value supplied from the signal processing section 22. The thus-acquired value β is compared with a target value βo, thereby computing recording power at which the target value βo is acquired and taking the thus-computed recording power as initial optimal recording power Po. Moreover, when recording the data supplied from the higher-level device into the data area of the optical disk 10, the controller 30 performs ROPC to thus subject initial optimal recording power Po to feedback control. In short, the level B supplied from the signal processing section 22 is monitored, to thereby control the initial optimal recording power Po in an incremental/decremental manner in accordance with the level B. Incremental/decremental adjustment is performed by means of controlling the recording power P in accordance with the quantity of reflected light B such that the following equation stands.

$$Bo/Po^n = B/P^n$$

This "n" has hitherto been fixed to a certain value. However, the controller 30 of the present embodiment computes the value of "n" by means of arithmetic operation during performance of OPC. Thus, ROPC can be performed by means of setting a value of "n" optimal for the combination of a set optical disk with the optical disk drive.

Figure 2:
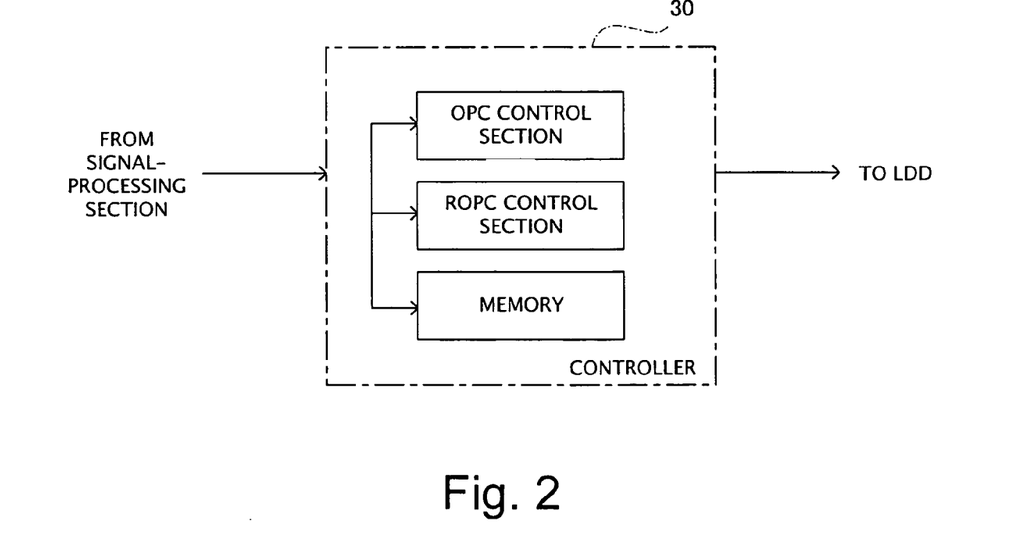
FIG. 2 is a block diagram of a controller shown in FIG. 1.

FIG. 2 shows a functional block diagram of the controller 30 shown in FIG. 1. The controller 30 has an OPC control section for effecting OPC, an ROPC control section for effecting ROPC, and memory for storing various parameters. The controller 30 is formed from a microcomputer, and the OPC control section and the ROPC control section are each formed from a CPU of a microcomputer. The memory is made up of ROM and RAM.

The OPC control section computes a value β from a peak value and a bottom value, which have been supplied from the signal processing section 22, to thus compute, from the computed value β, recording power Po—at which a target value βo is obtained—by means of a linear approximation. The computed initial optimum recording power Po and Bo—which is a level B (a reference value) of reflected light acquired when test data have been recorded at the recording power Po—are stored in the memory. The OPC control section records the test data by means of changing recording sensitivity in various manners, to thus select a plurality of combinations (B, P) of the quantity of reflection light B by means of which the values β become essentially equal to each other with recording power P. Several methods are available for making recording sensitivity different. Preferable methods include:

(1) a method for changing the rotational speed of the optical disk 10;

(2) a method for changing a tilt angle of the pickup 12; and (3) a method for changing the focus offset of the pickup 12.

The controller 30 changes, e.g., the rotational speed of the optical disk 10 in two stages (N1 and N2), to thus record and reproduce the test data at various rotational speeds, thereby acquiring various combinations (Bi, Pi). For example, (B11, P11) and (B21, P21) are acquired as sets to be acquired at the rotational speed N1; and (B12, P12) and (B22, P22) are acquired as sets for the rotational speed N2. Provided that (B21, P21) and (B22, P22) are sets by means of which essentially-equal values β are acquired, the controller 30 selects these sets and uses arithmetic operation to compute "n" which satisfies the following equation.

$$B21/P21^n = B22/P22^n$$

The equation of $B/P^n$=a constant value, which is the basic control equation employed during performance of ROPC, is intended to acquire the same value β over the entire circumference of the optical disk 10. In the present embodiment, the equation is for more directly setting the value of "n" at which the same value β is acquired (recording sensitivity can change in various manners over the entire circumference of the optical disk 10) even when recording sensitivity has changed in any of various manners. By means of setting "n" in this way, a difference between recording sensitivities is absorbed, and recording power P at which the same value β is acquired is readily obtained. The thus-computed "n" is stored in memory.

The ROPC control section controls optimum recording power by use of the level B and the optimum recording power Po, which have been supplied from the signal processing section 22, and the target value Bo recorded in advance in memory. Specifically, the ROPC control section sets recording power P such that an equation of $Bo/Po^n = B/P^n$ is achieved, and computes the next recording power Pr from the following equation (2) by use of the computed recording power P.

$$Pr = (1-\alpha) \cdot Pc + \alpha \cdot P \quad (2)$$

The coefficient α is a real number fulfilling 0<α<1.

Equation (2) signifies the following. Namely, when recording power P is merely computed and the thus-computed recording power P is adopted as the next recording power, the recording power P is set regardless of the current recording power Pc. As shown in FIG. 8, the recording power eventually fluctuates to thus fail to converge. Equation (2) controls the amount of contribution of recording power P to the next recording power, thereby adjusting a balance between the current recording power Pc and the recording power P. Here, a value of α=1 means a conventional method for performing ROPC. In contrast, a value of α=0 means that ROPC is not performed. In the present embodiment, the amount of contribution of recording power P computed by Equation (1) is adjusted by means of introduction of the coefficient α to thus suppress fluctuations in recording power and to converge recording power. Thus, evenness of recording equality is assured.

Figure 3:
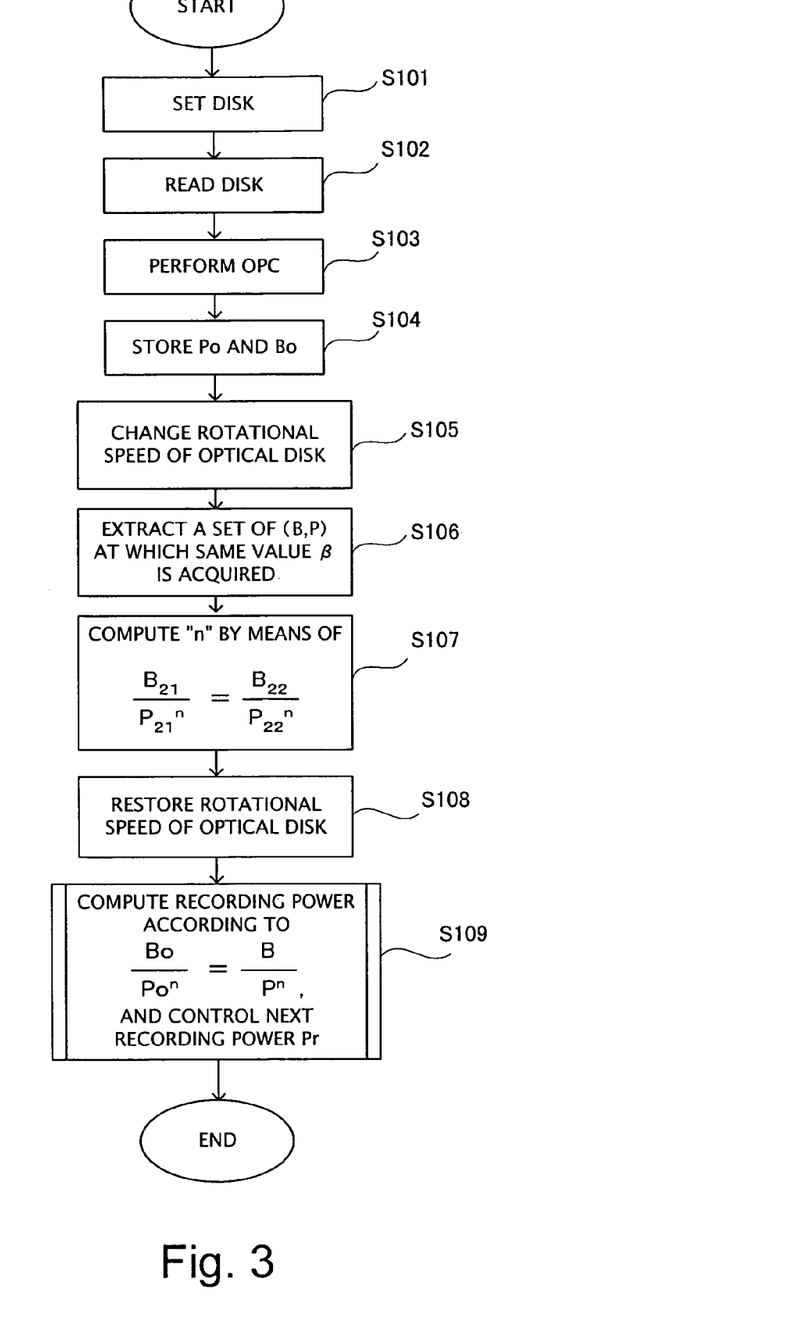
FIG. 3 is a processing flowchart of an embodiment of the present invention.

FIG. 3 shows an overall processing flowchart of the present embodiment. First, when the optical disk 10 is set (S101), identification information about the optical disk 10 formed in a lead-in area of the optical disk 10 is read (S102). A result of identification is stored in the memory of the controller 30. Next, OPC is performed (S103). In OPC, test data are written, on a trial basis, while recording power is changed in multiple stages. The quantity of reflected light β acquired during the trial writing of the test data and a value β acquired by reproduction of the test data are detected. Recording power at which a target value β is attained is taken as initial recording power Po. At the time of performance of OPC, the controller 30 stores in memory the initial recording power Po and a corresponding quantity of reflected light Bo (S104). These OPC operations are performed at a rotational speed optimum for the optical disk 10 (the highest speed N1 in normal times).

After performance of OPC, the controller 30 changes the rotational speed of the optical disk 10, thereby changing recording sensitivity (S105). For instance, the controller 30 changes the recording sensitivity by means of changing the rotational speed from N1 to N2, which is slower than N1. The test data are again recorded by means of variously changing the recording power P at the rotational speed N2, and the quantity of reflected light B and the value β, which are acquired at that time, are computed. As mentioned above, the following data are acquired.

<Rotational Speed N1>

Recording Power: P11, P21, P31, . . .

The quantity of reflected light acquired at each of the recording power levels: B11, B21, B31, . . .

Value β acquired at each of the recording power levels: β11, β21, β31, . . .

<Rotational Speed N2>

Recording Power: P12, P22, P32, . . .

The quantity of reflected light acquired at each of the recording power levels: B12, B22, B32, . . .

Value β acquired at each of the recording power levels: β12, β22, β32, . . .

The controller 30 compares the values β of these sets of data with each other, thereby extracting a combination which enables acquisition of the same value β. The same value β is preferably in the vicinity of βo, which is the target value β. For instance, in the case of β21≈β22≈βo, a combination (B21, P21) acquired at the rotational speed N1 and the combination (B22, P22) acquired at the rotational speed N2 are extracted (S106). After extraction of a combination by means of which the same value β is acquired even at different recording sensitivities, the controller 30 computes "n" which fulfills the following equation by use of the sets (S107).

$$B21/P21^n = B22/P22^n$$

After computation of the optimum "n," the rotational speed of the optical disk 10 is reset to N1 (S108); the recording power P is computed by use of the computed "n" by means of $Bo/Po^n = B/P^n$; and the next recording power Pr is controlled by use of the recording power P to thus record data (S109).

Figure 4:
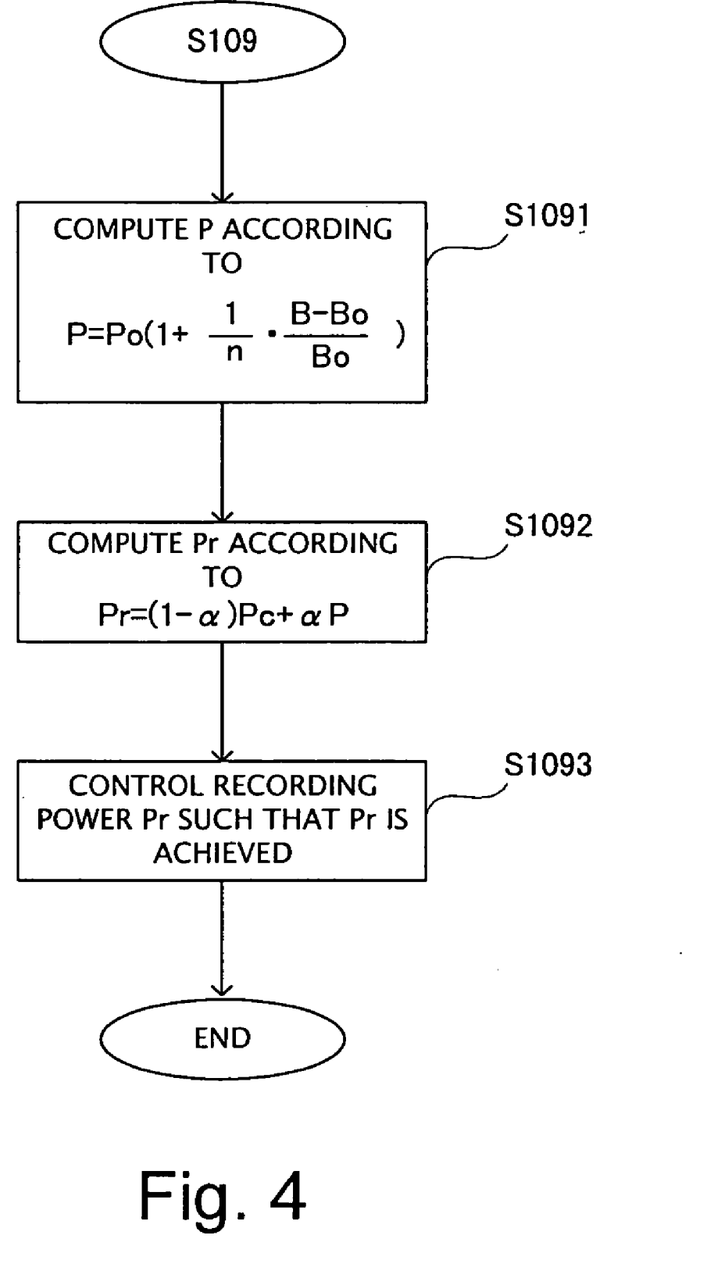
FIG. 4 is a detailed flowchart of processing pertaining to step S109 in FIG. 3.

FIG. 4 shows a detailed flowchart of processing pertaining to S109 shown in FIG. 3. The controller 30 modifies Equation (1), and computes the recording power P from the current quantity of reflected light B by means of the following equation (S1091).

$$P=Po[1+1/n\cdot(B-Bo)/Bo]$$

The next recording power Pr is computed by use of the coefficient α and by means of the following equation (S1092).

$$Pr=(1-\alpha)\cdot Pc+\alpha\cdot P$$

The coefficient α has been set in advance in memory in response to the optical disk 10, and the value corresponding to the optical disk is read from the memory. The coefficient α may also be set in response to the parameter "n." After computation of the next recording power Pr, the controller 30 supplies the LDD 32 with a control signal; controls the recording power of the LD so as to attain Pr; and records data (S1093).

Figure 5:
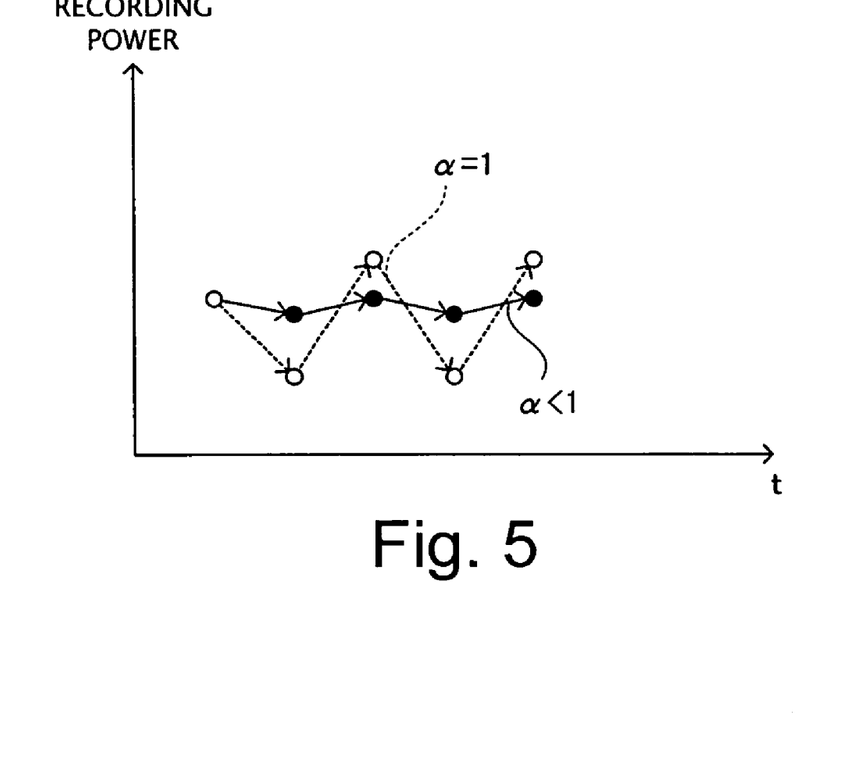
FIG. 5 is a descriptive view of hourly changes in recording power of the present embodiment.

FIG. 5 shows hourly changes in recording power having arisen during performance of ROPC of the present embodiment. For comparison, hourly changes in recording power having arisen during performance of conventional ROPC are also shown, by broken lines (see FIG. 8). Conventional ROPC corresponds to a coefficient of α=1. The coefficient α of the present embodiment is α<1, and the next recording power Pr as well as recording power P are set in consideration of the current recording power Pc. Consequently, the next recording power Pr is set without greatly departing from the current recording power Pc. Thus, fluctuations in recording power are suppressed.

Figure 6:
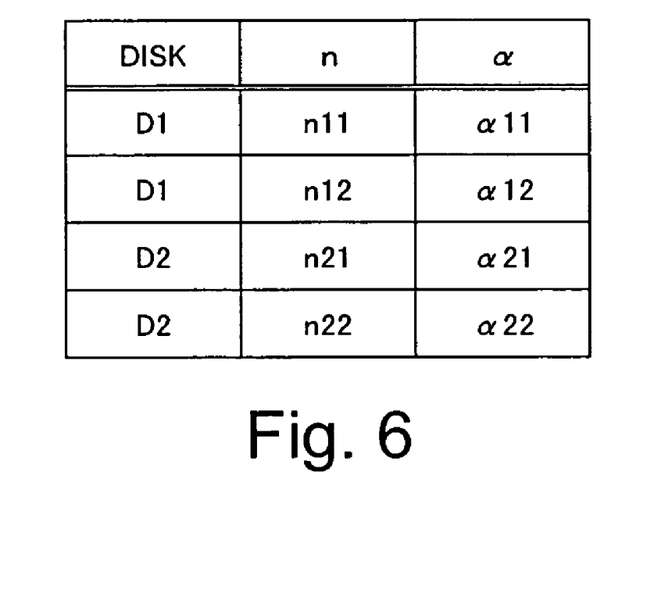
FIG. 6 is a table descriptive view for defining a relationship among an optical disk, a parameter "n," and a coefficient α.

FIG. 6 shows the coefficient α previously stored in memory of the controller 30 in the form of a table. The coefficient α is set for each optical disk and each parameter "n." Although the parameter "n" is computed in S107 shown in FIG. 3, the coefficient α is adaptively set according to the value of "n." For instance, when the parameter "n" set in S107 is n11, the coefficient α is set to α11. Meanwhile, when the parameter "n" is n12 (n11≠n12), the coefficient α is set to α12 (α11≠α12). The relationship between the parameter "n" and the coefficient α may be specified as a function of α=f(n) rather than as a table. By way of example, settings are made such that the value of the coefficient α increases with an increase in the parameter "n." Specifically, settings are made such that a positive correlation exists between the coefficient α and the parameter "n." Since the effectiveness of ROPC deteriorates as the parameter "n" increases, the chance of divergence of the recording power P becomes small even when the amount of contribution of the recording power P is increased.

Although the embodiment of the present invention has been described above, the present invention is not limited to the embodiment and is susceptible to various alterations.

For instance, although in the present embodiment the parameter "n" is computed by use of the set by means of which the same value β is acquired, the parameter "n" may also be computed by use of a set by means of which the same degree of modulation is acquired. On the assumption that the peak level of a certain data length (e.g., 11T) of a reproduced RF signal is C and the bottom level of the same is D, the degree of modulation "m" is defined as m=(C−D)/C.

Although in the present embodiment the rotational speed is changed for changing recording sensitivity, the same principle also applies to a case where the tilt angle of the pickup 12 is changed or a case where the focus offset is changed. After performance of OPC, recording sensitivity is lowered by means of changing the tilt angle through only a predetermined angle, and subsequently test data are recorded at various recording power levels, to thereby compute the value β. A set by means of which the values β acquired before and after changing of the tilt angle become equal to each other is extracted, and the parameter "n" is computed. Alternatively, after performance of OPC, the focus offset is changed by only a predetermined amount, to thus decrease recording sensitivity. Subsequently, test data are recorded at various recording power levels, and the value β is computed. Another set by means of which the values β acquired before and after changing of the focus offset become equal to each other is extracted, and the parameter "n" is computed. This method is particularly effective when the parameter "n" is computed by means of changing the rotational speed and when the optical disk 10 is driven at CAV (constant angular velocity). In CAV control, linear speed is changed according to the radial position of the optical disk 10. However, the parameter "n" set such that the value β can be maintained at a different linear speed can effectively address the change in linear speed.

In the present embodiment, the rotational speed may also be changed in three or more stages rather than in two stages. In a case where the rotational speed has been changed in three or more stages, when three or more sets by means of which essentially-equal values β are acquired can have been extracted, a plurality of parameters "n" may also be computed by use of two arbitrary sets, to thus compute an average of the plurality of parameters "n" and set a final parameter "n." The same also applies to the case of a tilt angle or the case of a focus offset.

In the present embodiment, the parameter "n" optimum for the optical disk 10 is computed by use of the value β or the degree of modulation "m," and ROPC is performed. In contrast, ROPC may be performed after the validity of the thus-computed parameter "n" has been evaluated. For instance, when the thus-computed "n" is one or less, the parameter is not adopted. However, when the parameter falls within a range from 1.5 to 5, the parameter "n" is adopted.

Although in the present embodiment the coefficient α is set for each optical disk, each parameter "n," and the like, the coefficient may also be set to a fixed value (e.g., α=0.5) regardless of the optical disk and the parameter "n," or the coefficient α may be set in accordance with only the parameter "n" regardless of the type of an optical disk. Alternatively, the coefficient α may also be set according to the rotational speed of the optical disk. When the coefficient α is set in accordance with the rotational speed of the optical disk, settings are made, e.g., in such a way that the coefficient α becomes greater as the rotational speed increases. Further, the coefficient α may also be set according to a linear speed. For instance, during CAV control, the coefficient α may also be increased as the radius of the optical disk increases.

In the present embodiment, the next recording power Pr is computed by means of the equation $$Pr=(1-\alpha)\cdot Pc+\alpha\cdot P.$$

However, there can also be used an arbitrary equation that takes into account the current recording power Pc and the recording power P. For instance, the next recording power Pr may also be computed by use of a coefficient "k" ("k" is a real number greater than one) and by means of $$Pr=1/k\cdot Pc+(1-1/k)\cdot P.$$

In the present embodiment, the recording power P may also be set by use of a parameter k1 and the following equation derived from the basic equation.

$$Bo/Po^n=(B/Pc^n)\cdot k1.$$

The parameter k1 is for determining whether or not the recording power is increased or decreased, according to the reflection characteristic of the optical disk 10; namely, whether the optical disk is an H-to-L type or an L-to-H type. Specifically, the parameter k1 is set as follows.

<In a Case where the Optical Disk 10 is of H-to-L Type>
  k1=1: recording power is maintained equal to the current recording power
  k1>1: recording power is decreased
  k1<1: recording power is increased.
In short, the recording power P is computed from the current recording power Pc by means of $$P = (1/k1) \cdot Pc \quad (3).$$

<In a Case where the Optical Disk 10 is of L-to-H Type>
  k1=1: recording power is maintained equal to the current recording power
  k1>1: recording power is increased.
  k1<1: recording power is decreased.
In short, the recording power P is computed from the current recording power Pc by means of $$P = k1 \cdot Pc \quad (4).$$

As mentioned above, the next recording power P is determined by the value of the parameter k1 according to the reflection characteristic of the optical disk 10. The parameter k1 is specifically computed as follows. In short, when the above equations are modified, the following relationship is acquired in relation to the current recording power Pc $$k1 \approx Bo\{1 + n(Pc - Po)/Po\}/B \text{ [where, } (Pc - Po)/Po \ll 1].$$

The value of k1 is computed by use of this equation. The next recording power is determined according to the reflection characteristic of the optical disk 10 and the result of a comparison between the value of k1 and the value of one. When the value of the thus-computed coefficient k1 is one, the relationship between the current recording power and the quantity of reflected light signifies that the following basic equation stands.

$$Bo/Po^n = B/P^n$$

Hence, the recording power for the next track is maintained at the current recording power Pc. When the value of the computed coefficient k1 fulfills a relationship of k1>1, the recording power changes according to the reflecting characteristic of the optical disk 10. When the optical disk is of H-to-L type, the recording power used for the next track is decreased from the current recording power Pc by a predetermined amount. The reason for this is that a relationship of k1>1 signifies that the level B is small; namely, that the quantity of reflected light has become excessively small because of excessive recording power. When the optical disk is of L-to-H type, the recording power for the next track is increased from the current recording power Pc by a predetermined amount. The reason for this is that a relationship of k1>1 signifies that the level B is small; namely, that the quantity of reflected light is still small because of a deficiency in recording power. Even when the value of the computed coefficient k1 satisfies a relationship of k1<1, the coefficient k1 changes according to the reflecting characteristic of the optical disk 10. When the optical disk is of H-to-L type, the recording power for the next track is increased from the current recording power Pc by a predetermined amount. The relationship of k1<1 means that the level B is large; namely, the quantity of reflected light is still large because of the deficiency in recording power. When the optical disk is of L-to-H type, the recording power for the next track is reduced from the current recording power Pc by a predetermined amount. The relationship of k1<1 means that the level B is great; namely, the quantity of reflected light has become excessively large because of excessive recording power.

Therefore, the next recording power Pr is computed as follows from Equations (2), (3), and (4).

<In a Case where the Optical Disk 10 is of H-to-L Type>

$$Pr = (1 - \alpha) \cdot Pc + \alpha \cdot P$$
$$= (1 - \alpha) \cdot Pc + \alpha \cdot (1/k1) \cdot Pc$$
$$= [(1 - \alpha) + \alpha \cdot (1/k1)] \cdot Pc$$

<In a Case where the Optical Disk 10 is of L-to-H Type>

$$Pr = (1 - \alpha) \cdot Pc + \alpha \cdot P$$
$$= (1 - \alpha) \cdot Pc + \alpha \cdot k1 \cdot Pc$$
$$= \{(1 - \alpha) + \alpha \cdot k1\} \cdot Pc$$

Still further, in the present embodiment, the recording power P may also be set by use of the following equation derived from a parameter k2 and the basic equation.

$$Bo/Po^n = B/(Pc \cdot k2)^n$$

The parameter k2 is also for determining whether or not the next recording power is increased or decreased, according to the reflection characteristic of the optical disk 10; namely, whether the optical disk is an H-to-L type or an L-to-H type. Specifically, the parameter k2 is set as follows.

<In a Case where the Optical Disk 10 is of H-to-L Type>
  k2=1: recording power is maintained equal to the current recording power
  k2>1: recording power is increased
  k2<1: recording power is decreased.
In short, the recording power Pr is computed by means of $$P = k2 \cdot Pc \quad (5).$$

<In a Case where the Optical Disk 10 is of L-to-H Type>
  k2=1: the next recording power is maintained equal to the current recording power
  k2>1: recording power is decreased.
  k2<1: recording power is increased.
In short, the recording power is computed by means of $$P = (1/k2) \cdot Pc \quad (6).$$

The parameter k2 is specifically computed as follows. In short, when the above equations are modified, the following relationship is acquired in relation to the current recording power Pc $$k2 \approx Po/Pc \cdot \{1 + 1/n \cdot (B - Bo)/Bo\} \text{ [where, } (B - Bo)/Bo \ll 1].$$

The value of k2 is computed by use of this equation. The next recording power is determined according to the reflection characteristic of the optical disk 10 and the result of a comparison between the value of k2 and the value of one. When the value of the thus-computed coefficient k2 is one, the relationship between the current recording power and the quantity of reflected light signifies that the following basic equation stands.

$$Bo/Po^n = B/P^n$$

Hence, the recording power for the next track is maintained at the current recording power Pc. When the value of the computed coefficient k2 fulfills a relationship of k2>1, the recording power changes according to the reflecting characteristic of the optical disk 10. When the optical disk is of H-to-L type, the recording power used for the next track is increased from the current recording power Pc by a predetermined amount. The reason for this is that a relationship of k2>1 signifies that the level B is large; namely, that the quantity of reflected light has become large because of a deficiency in recording power. When the optical disk is of L-to-H type, the recording power for the next track is decreased from the current recording power Pc by a predetermined amount. The reason for this is that a relationship of k2>1 signifies that the level B is large; namely, that the quantity of reflected light is large because of excessive recording power.

Even when the value of the computed coefficient k2 satisfies a relationship of k2<1, the coefficient k2 changes according to the reflecting characteristic of the optical disk 10. When the optical disk is of H-to-L type, the recording power for the next track is decreased from the current recording power Pc by a predetermined amount. The relationship of k2<1 means that the level B is small; namely, the quantity of reflected light is small because of excessive recording power. When the optical disk is of L-to-H type, the recording power for the next track is increased from the current recording power Pc by a predetermined amount. The relationship of k2<1 means that the level B is small; namely, the quantity of reflected light is low because of a deficiency in recording power.

Therefore, the next recording power Pr is computed as follows from Equations (2), (5), and (6).

<In a Case where the Optical Disk 10 is of H-to-L Type>

$$Pr = (1-\alpha) \cdot Pc + \alpha \cdot P$$
$$= (1-\alpha) \cdot Pc + \alpha \cdot k2 \cdot Pc$$
$$= [(1-\alpha) + \alpha \cdot k2] \cdot Pc$$

<In a Case where the Optical Disk 10 is of L-to-H Type>

$$Pr = (1-\alpha) \cdot Pc + \alpha \cdot P$$
$$= (1-\alpha) \cdot Pc + \alpha \cdot (1/k2) \cdot Pc$$
$$= \{(1-\alpha) + \alpha \cdot (1/k2)\} \cdot Pc$$

Preferably, the data in the lead-in area are reproduced immediately after the optical disk 10 has been set and the reflection characteristic of the optical disk 10 is identified by means of the disk characteristic data previously recorded in the lead-in area. Although ROPC control operation has been described as being performed on a per-recording-track basis, ROPC control may also be performed every time a predetermined time elapses since the start of recording. Namely, the essential requirement is to perform ROPC at predetermined timing.

What is claimed is:

1. An optical disk apparatus configured to perform ROPC (Running Optimum Power Control) during recording of actual data, comprising:
   means for recording test data in a predetermined area of an optical disk and setting an initial recording power Po on the basis of quality of a reproduced signal of the test data;
   an ROPC control section configured to compute a recording power P from at least the quantity of initial reflected light Bo, the initial recording power Po, and the current quantity of reflected light B, and to compute the next recording power Pr from at least the computed recording power P, current recording power Pc, and a coefficient $\alpha$ ($0<\alpha<1$); and
   a controller configured to dynamically control recording power during recording of actual data using the computed next recording power Pr.

2. The optical disk apparatus of claim 1, wherein the recording power P is computed according to the equation $Bo/Po^n = B/P^n$.

3. The optical disk apparatus according to claim 2, wherein the ROPC control section computes the next recording power Pr by use of the coefficient $\alpha$ ($0<\alpha<1$), the computed recording power P, and the current recording power Pc and by means of $$Pr=(1-\alpha) \cdot Pc + \alpha \cdot P.$$

4. The optical disk apparatus according to claim 3, wherein the coefficient $\alpha$ is dynamically set in accordance with the parameter "n."

5. The optical disk apparatus according to claim 4, wherein the coefficient $\alpha$ is set so as to become greater as the parameter "n" increases.

6. The optical disk apparatus according to claim 3, wherein the coefficient $\alpha$ is dynamically set in accordance with the rotational speed or linear speed of the optical disk.

7. The optical disk apparatus according to claim 2, wherein the parameter "n" is set by means of a plurality of combinations of the current quantity of reflected light B and the recording power P, by means of which an identical value $\beta$ or an identical degree of modulation is acquired when the test data are recorded at different recording sensitivities.

8. The optical disk apparatus according to claim 7, wherein the different recording sensitivities are achieved by means of changing rotational speed of the optical disk.

9. The optical disk apparatus according to claim 7, wherein the different recording sensitivities are achieved by means of changing a tilt angle of a pickup.

10. The optical disk apparatus according to claim 7, wherein the different recording sensitivities are achieved by means of changing a focus offset of a pickup.

11. The optical disk apparatus according to claim 8, wherein the parameter "n" is set so as to fulfill $B1/P1^n = B2/P2^n$ by use of a value P1 of the recording power P and a value B1 of the current quantity of reflected light B, which are achieved when the rotational speed of the optical disk is N1, as well as a value P2 of the recording power P and a value B2 of the current quantity of reflected light B, which are achieved when the rotational speed of the optical disk is N2.

12. The optical disk apparatus according to claim 1, wherein the ROPC control section computes a parameter k1 from the quantity of the initial reflected light Bo and the initial recording power Po, both of which are acquired during initial setting, and from the current quantity of reflected light B and the current recording power Pc and by means of $k1=Bo\{1+n(Pc-Po)/Po\}/B$;
   wherein the ROPC control section computes the recording power P, when a reflection characteristic of the optical disk is to decrease reflectivity because of data recording, by means of $P=(1/k1) \cdot Pc$; and
   wherein the ROPC control section computes the recording power P by means of $P=k1 \cdot Pc$ when the reflection characteristic of the optical disk is to increase reflectivity because of data recording.

13. The optical disk apparatus according to claim 12, wherein the ROPC control section computes, when the reflection characteristic of the optical disk is to decrease reflectivity because of data recording, the next recording power Pr from the coefficient $\alpha$ ($0<\alpha<1$), the recording power P, and the current recording power Pc and by means of $Pr=\{(1-\alpha)+\alpha\cdot(1/k1)\}\cdot Pc$; and computes, when the reflection characteristic of the optical disk is to increase reflectivity because of data recording, the next recording power Pr by means of $Pr=\{(1-\alpha)+\alpha\cdot k1\}\cdot Pc$.

14. The optical disk apparatus according to claim 1, wherein the ROPC control section computes a parameter k2 from the quantity of initial reflected light Bo and the initial recording power Po, both of which are acquired during initial setting, and from the current quantity of reflected light B and the current recording power Pc and by means of $k2=Po/Pc\cdot\{1+1/n\cdot(B-Bo)/Bo\}$;

wherein the ROPC control section computes the recording power P, when the reflection characteristic of the optical disk is to decrease reflectivity because of data recording, by means of $P=k2\cdot Pc$; and wherein the ROPC control section computes the recording power P, when the reflection characteristic of the optical disk is to increase reflectivity because of data recording, by means of $P=(1/k2)\cdot Pc$.

15. The optical disk apparatus according to claim 14, wherein the ROPC control section computes, when the reflection characteristic of the optical disk is to decrease reflectivity because of data recording, the next recording power Pr from the coefficient $\alpha$ ($0<\alpha<1$), the recording power P, and the current recording power Pc and by means of $Pr=\{(1-\alpha)+\alpha\cdot k2\}\cdot Pc$; and computes, when the reflection characteristic of the optical disk is to increase reflectivity because of data recording, the next recording power Pr by means of $Pr=\{(1-\alpha)+\alpha\cdot(1/k2)\}\cdot Pc$.

* * * * *